Aug. 29, 1961     E. G. SHETTLER     2,998,276
REFUSE CAN COVER SECURING DEVICE
Filed Sept. 11, 1958
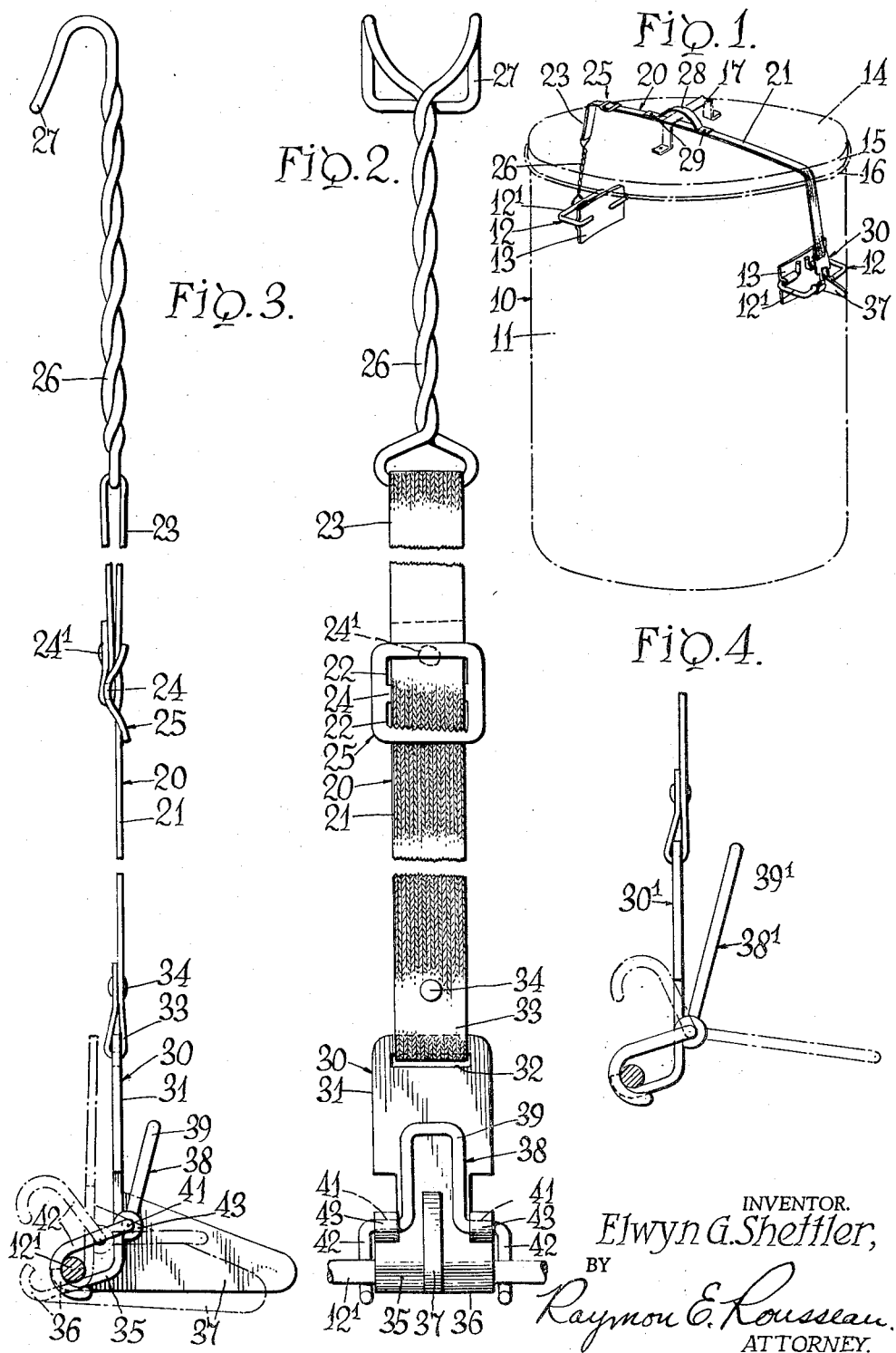
INVENTOR.
*Elwyn G. Shettler,*
BY
*Raymon E. Rousseau.*
ATTORNEY.

United States Patent Office 2,998,276
Patented Aug. 29, 1961

2,998,276
REFUSE CAN COVER SECURING DEVICE
Elwyn G. Shettler, Hamburg, N.Y.
Filed Sept. 11, 1958, Ser. No. 760,491
7 Claims. (Cl. 292—288)

My invention relates to devices for detachably securing a receptacle cover on a receptacle and more particularly to manually operable devices, operable to quickly secure a refuse can cover on the can and to quickly release the cover for removal.

Some prior devices, which have been provided for this purpose, have been objectionable in that they require the use of both hands to release the cover, and in that their constructions are such that when they are subjected to the elements and use they become difficult to operate.

Some prior devices have been objectionable because their successful operation depends on a normal fit between the cover and the can, and since, after relatively short periods of normal use by the owner and abuse by sanitation crews, the cover and the can become battered and deformed, thereby destroying the normal fit therebetween so that these prior devices cannot be operated satisfactorily.

An object of the present invention is to overcome all of the objections to prior devices for detachably securing a refuse can cover on a refuse can.

Another object is to provide a simple, inexpensive and easily packable refuse can cover securing and releasing device.

Another object is to provide such a device which is quickly operable by hand to secure the cover on the can against removal by children and animals and which is quickly operable by one hand to release the cover for partial removal to deposit material therein or the complete removal required to allow disposal of the contents of the can by sanitation crews.

Another object is to provide such a device which is detachably securable to the cover to prevent its misplacement or loss and to allow its ready removal and replacement when necessary.

Another object is to provide such a device which will secure the cover upon the can despite some overloading of the latter and which notwithstanding considerable deformation of the can and its cover, will secure the cover upon the can and prevent access to its contents by children and animals.

These and other objects of the present invention will appear from the following detailed descriptions of presently prepared forms thereof and from the drawing wherein:

FIGURE 1 is a prospective view showing how the device of the present invention is formed and secured to the handles of a refuse can to secure its cover thereupon against removal by children and animals and to allow its ready release and removal from the can.

FIGURE 2 is an enlarged plan view showing end portions of the device depicted in FIGURE 1.

FIGURE 3 is a side elevational view of FIGURE 2, and

FIGURE 4 is a side elevational view of a modified form of the invention.

Referring now to FIGURE 1 of the drawing a conventional cylindrical refuse can is generally indicated by the numeral 10. The can 10 has been shown in dot and dash lines to better illustrate the invention and at opposite sides of its side wall 11, adjacent to its top open end, is provided with conventional handles 12, each of which includes a mounting member 13 and a handle forming loop 12', pivotally carried by the member 13 for swingable movement from a dependent position to an outwardly extending can carrying position.

A cover 14, also shown in dot and dash lines, is of a size and shape to embrace and detachably fit, open and close, the open end of the can and is formed with the usual depending flange portion 15 having its free edge beaded as at 16. The center portion of the cover 14 is provided with a suitable handle 17 for removing and replacing the cover 14.

My invention resides in providing a simple, inexpensive and effective device which is manually operable quickly to detachably secure the cover upon a refuse can and to remove it from the can. This device, generally indicated by the numeral 20, includes a slightly resilient section of webbing 21, which has one of its end portions threaded through the openings 22, then looped as at 23, and has its terminal end portion looped about and secured to the cross bar 24 of a suspender type adjusting device 25 by a rivet 24', whereby the length of the loop may be readily adjusted, suspender fashion, to adjust the overall length of the webbing 21.

A wire hook member 26 has one of its ends formed to be engaged in and carried by the loop 23 and has its free opposite end formed with a hook 27 which is readily engageable with and detachable from either of the handles 12.

As shown in FIGURE 1, the webbing 21 spans and engages the top surface of the cover and, being extended through the cover handle 17, has its intermediate portion detachably secured to the handle 17, by any suitable means, which may, for example, comprise another short section of webbing 28, which is looped over and embraces the handle 17 and may have its ends permanently secured to the webbing 21, but which preferably has either or both of its ends detachably secured thereto as indicated at 29, whereby my device may be readily connected to the handle 17 and may be readily removed therefrom whenever such removal is desired.

A combined webbing securing and locking means, generally indicated by the numeral 30, is carried by and formed to detachably secure the opposite end of the webbing 21 to the other handle 12. As best shown in FIGURES 2 and 3 the means 30 includes a rigid sheet material body 31 having its upper end provided with an opening 32 to receive said opposite end of the webbing 21 which is extended therethrough, then looped as at 33, and has its end secured to the webbing by a rivet 34. The body 31 thus depends from the loop 33 and its lower end is formed with an outwardly and downwardly inclined portion 35 which terminates in an upturned hook portion 36. It will be apparent that the length of the webbing may be properly adjusted to suit the size of the cover and the location of the handles 12, and that when so adjusted, and the hook 27 is engaged with one handle 12, the hook portion 36 of the means 30 will be located slightly above the other handle 12, but due to the slight resilience of the webbing the hook 36 may be forced under the handle 12 to assume the position shown in full lines in FIGURE 3.

In order to facilitate the engagement of the hook 36 with the handle 12, the body 31 is provided with an outwardly projecting horn or finger-piece 37 which may be grasped to force the hook 36 down under and into engagement with the handle 12. The horn 37 also serves as a lever arm so that when a horizontally acting lateral force is applied thereto by one hand of the user, the body 31 is partially rotated and its inclined portion 35 acts against the underside of the associated handle 12 to cam the body downwardly and the hook portion 36 out of engagement with the handle, thereby releasing the webbing and allowing the cover to be partially or completely removed from the can.

To insure against disengagement of the hook 36 from the associated handle, except when desired, the body 31 carries a locking member 38, which may be engaged with said handle in the manner shown in full lines in FIGURE 3, to positively prevent the hook 36 from being disengaged from said handle until the member 36 is moved by finger pressure to the dot and dash line position in FIGURE 3.

The member 38, being preferably formed of a section of suitable wire, is bent midway between its ends to form a finger operable loop 39, then is bent outwards and normal to the sides of the loop to form the coplanar and axially alined trunnion portions 41 and beyond each trunnion the free ends of the wire are each bent to provide a locking hook portion 42, which portions extend normal to their trunnion portion and in a downward and outward relation to the loop portion. Each of the trunnion portions 41, is pivotally secured to the body 31 to allow swinging movement of the member 38 between its locked and unlocked positions, to provide a simple and inexpensive mounting for the trunnions 41, each side of the body is slit and formed with an integral eye 43, located to allow the swinging movement of the member 38.

From the foregoing it will be seen that my device can be adjusted to fit different sizes of cans and their covers; that it cannot be inadvertently lost or displaced from the cover and that it can be quickly operated to secure and release the cover.

In the modified form shown in FIGURE 4 the horn or finger-piece 37 has been eliminated and a combined form of finger-piece and locking member 38' has been substituted for the finger-piece 37 and the locking member 38.

The device 30', except for the substitution of a combined form of horn and locking member 38' for the horn 37 and the locking member 38, has the same construction and operation as the device 30 and need not be described in detail other than to say that the loop 39' of the member 38' is extended so that it may be readily used to perform the above described functions of the horn 37 and the locking member 38.

It should be understood that the herein illustrated and described forms of my invention are intended to exemplify its principles and that various rearrangements and modifications of its component parts may be made within the scope of the appended claims wherein:

I claim:

1. A device for detachably securing the cover upon a refuse can of the type wherein the cover is provided with a handle and the can is provided with a pair of handles, comprising a section of resilient webbing extended through the cover handle for engagement with the top surface of the cover, a hook carried by one end of the webbing for detachably securing it to one of the can handles, and a combined attaching and locking means carried by the other end of the webbing for detachably securing and locking it to the other can handle, said means being carried by the other end of the webbing and including an inwardly bent attaching hook portion for detachable engagement with said can handle, and an outwardly bent locking hook carried by the attaching hook portion for movement toward said hook portion and locking engagement with said handle, whereby said hooks cooperate in detachably securing and locking the webbing in its cover securing position until the locking hook is first disengaged from the handle to allow disengagement of the attaching hook therefrom, thereby releasing the webbing and allowing removal of the cover from the can.

2. The device set forth in claim 1 wherein the attaching hook portion comprises a plate having its lower end formed with a downwardly and inwardly inclined cam portion terminating in an inwardly and upwardly curved hook formed to engage beneath and partially embrace the associated can handle, whereby by and during a lateral twisting movement of the thus engaged plate the cam portion acts against the can handle and causes disengagement of the hook therefrom.

3. The device set forth in claim 2 wherein the plate intermediate its ends is formed to pivotally support the locking hook, and said locking hook, being pivotally secured to the plate, is formed with a finger piece extended beyond its pivotal connection for swinging it into direct locking engagement with the can handle engaged by the attaching hook and for swinging it out of engagement with the handle, thereby allowing the attaching hook to be removed from the handle.

4. The combination set forth in claim 2 wherein the lower end of the plate is provided with an outwardly projecting horn for facilitating manually engaging the hook portion with the associated handle and for facilitating manually twisting the plate to cause its hook to disengage from the handle.

5. The combination set forth in claim 1, wherein one end of the webbing is looped and provided with loop adjusting and securing means, whereby the webbing may be adjusted to adapt the device for use with different sizes of cans.

6. The combination set forth in claim 1 wherein the webbing is provided with a lock means detachably secured to the webbing intermediate its ends for detachably securing it to the cover handle.

7. The combination set forth in claim 1 wherein the combined attaching and locking means is provided with an outwardly projecting horn for manually engaging said means with the associated can handle and for rotating said means in a transverse direction after disengaging its locking hook from the handle, thereby allowing disengagement of said means from said handle.

References Cited in the file of this patent

UNITED STATES PATENTS

| | | |
|---|---|---|
| 862,908 | Hawkinson | Aug. 13, 1907 |
| 1,817,796 | Arnott | Aug. 4, 1931 |
| 2,539,997 | Graves | Jan. 30, 1951 |
| 2,809,008 | Halvarson | Oct. 8, 1957 |

FOREIGN PATENTS

| | | |
|---|---|---|
| 548,166 | Germany | Mar. 31, 1928 |